United States Patent Office 2,831,846
Patented Apr. 22, 1958

2,831,846

MELTING OF POLYETHYLENE

Richard E. Edmonson, Freeport, and William F. Wroth, Lake Jackson, Tex., assignors to The Dow Chemical Company, Midland, Mich., a corporation of Delaware No Drawing. Application October 31, 1955
Serial No. 544,073

5 Claims. (Cl. 260—94.9)

This invention relates to the conversion of a granular, or pulverulent, solid form of polyethylene having a low bulk density to a heat plastified, or molten, form having high density. It particularly relates to the treatment of low bulk density polyethylene powder or granules to render that material suitable for molding by extrusion.

Polyethylene is sometimes obtained in the form of a fluffy powder having a low bulk density. The term "bulk density" of a powder or granulated material refers to the weight per unit of total volume of a bed of the particulate material, the voids in and between the solid particles being filled with air at atmospheric pressure. The bulk density of polyethylene powder is often in the order of from 2 to 10 pounds per cubic foot, whereas the true density of the solid polymer is of the order of 55 to 60 pounds per cubic foot. In low bulk density powders of this kind, from 80 to more than 95 percent of the apparent volume consists of voids filled with air.

In order to utilize low bulk density powder or granulated solid polyethylene for the purpose of thermally shaping the polymeric solid into useful articles, e. g. by injection molding, extrusion, or the like, it is necessary to melt the polymer solid particles, to separate the air from the voids, and to fuse the polymer particles into a homogeneous heat-plastified mass that is substantially free of gas voids. The direct melting of low-density solid polyethylene powder, e. g. by applying heat to a vessel containing the same, is unsatisfactory for many reasons, among which are these: the low heat-conductivity of the polymer, especially of low density solid powders, retards the flow of heat from the heating surface through the interior of the quantity of powder; the polymer immediately adjacent the heating surface is often deleteriously affected by the prolonged heating and excessively high temperatures required to drive heat into portions of the polymer powder that are remote from the heating surface; the polymer is deleteriously affected by contact at high temperatures with air initially contained in the voids of the low-density powder.

An object of this invention is to provide an improved method for converting a granular, or pulverulent, solid form of polyethylene having low bulk density to a heat-plastified, or molten, form having high density.

Another object is to provide such a method whereby the solid particles of polymer are heated uniformly and quickly to fusion temperatures, without being subjected to excessively high temperatures.

A further object is to provide such a method whereby the fusion of the solid particles of polymer is carried out substantially without deleterious contact of the polymer with air.

Other objects and advantages of the invention will be evident in the following description.

The objects of this invention have been attained in a method, hereinafter described in detail, wherein an ethylene polymer in particulate form, i. e. in the form of granular or pulverulent solid particles, having a low bulk density, is admixed with a heat transfer liquid that is substantially a non-solvent for, insoluble in, and chemically inactive with, the polymer at its fusion temperature, the resulting admixture is heated to a temperature at which the polymer particles fuse but below the temperature of thermal degradation, the polymer particles are caused to fuse together to a heat-plastified, or molten, mass, and that heat-plastified, or molten, mass is separated from the heat-transfer liquid.

The exercise of this invention permits the solid polymer particles to be heated quickly and uniformly to fusion temperatures, without being subjected to excessively high temperatures and substantially without contact with air, whereby a low bulk density granular, or pulverulent, material is readily converted to a heat-plastified, or molten, mass suitable for shaping into useful articles.

Suitable heat transfer liquids for practice of the present method are those that are:

(a) Substantially non-solvent for the polymer at the temperatures employed in the process;
(b) Substantially insoluble in the polymer at the temperatures employed in the process;
(c) Substantially inactive chemically at the temperatures employed in the process; and
(d) Appreciably more or less dense than the polymer, in order to facilitate separation of the liquid from the heat-plastified mass.

In addition, the liquid should be quite volatile in order that traces remaining in the heat-plastified polymer mass may readily be vaporized.

Water satisfies the requirements for the heat transfer liquid very well and is usually preferred. However, it is necessary to carry out the operations of the method with water under pressure in order to maintain the liquid state at temperatures of fusion of the polymer. In place of water there can be used a glycol such as ethylene glycol or a polyglycol such as diethylene glycol or triethylene glycol or mixtures thereof with each other or with water whereby liquids having atmospheric boiling points above the fusion temperature of the polymer can be obtained. Other polar liquids, such as lower aliphatic alcohols, that meet the specifications set forth hereinbefore can be used in place of, or together with, water or glycol, if desired.

In practice of the method of this invention, a granular or perverulent solid polymer of ethylene is admixed with one of the liquids just described, preferably water, in relative proportions such that there results a fluid, stirrable, pumpable slurry of the solid particles in the liquid medium. At least 40, preferably at least 50, volume percent of liquid is usually required. It is usually convenient to use from 50 to 95 volume percent of liquid, and correspondingly from 50 to 5 volume percent of polymer solid, although less than 5 percent of solid polymer can be used, if desired.

The slurry of polymer particles in heat transfer liquid is usually prepared at a temperature below the fusion temperature of the polymer in order to facilitate uniform dispersion of the solid particles and to permit escape of air from the slurry before attaining fusion temperature.

The resulting slurry of solid polymer particles in heat transfer liquid is then heated. The temperature of the slurry is raised to, and maintained at, such temperatures that fusion of the polymer particles can occur, but below the temperatures at which appreciable degradation of either the polymer or of the heat transfer liquid occurs. The minimum fusion temperature depends on the particular polymer of ethylene, but is usually between about 100° and about 135° C. Usually, it is desirable to exceed the minimum temperature somewhat in order to make the polymer more fluid, thereby facilitating its coalescence, and temperatures from about 150° to about 300° C. are preferred. The pressure upon the slurry must be such as to maintain the same in the liquid phase.

During the heating period, agitation of the slurry is desirable in order to provide uniform heating of the slurry. When the slurry reaches the desired fusion temperature, agitation is preferably discontinued, and the slurry is allowed to separate under quiescent conditions. Thereupon the particles of polymer coalesce, fuse, and melt together into a mass in which the original particles lose their identity. When the density of the heat transfer liquid, e. g. water or glycol, is greater than that of the polymer, the fused polymer mass separates substantially from the heat transfer liquid as an upper layer. The layer of heat-plastified, or molten, polymer can then be withdrawn, freed of traces of heat-transfer liquid, if necessary, and further processed in any desired manner. For example, the heat-plastified polymer can be shaped into useful articles in known manner, such as by injection molding or extrusion.

The layer of heat transfer liquid can advantageously be used to prepare further quantities of slurry of polymer for use in the process.

The operations involved in this method can be carried out in continuous manner.

The following examples illustrate the invention, but are not to be construed as limiting its scope.

Example 1

The polymer employed in this example was a polyethylene having an average molecular weight of about 26,000 as determined by a melt viscosity method. The polymer was in a pulverulent form having a bulk density of 6 pounds per cubic foot.

A slurry was prepared of 10 parts by weight of the polyethylene powder in 90 parts by weight of water. The resulting slurry was pumped through a jacketed pipe, the pipe being heated at a temperature of 250° C. The heated slurry passed from the pipe to a separatory vessel, wherein a lighter density molten polymer layer collected over the higher density liquid water layer. Pressure in the heating pipe and in the separatory vessel was maintained at 800 p. s. i. g. From the separatory vessel there was withdrawn a stream of the polymer layer into a heated receiver vessel at atmospheric pressure. The temperature of the polymer was maintained above its fusion temperature in the receiver vessel and traces of water in the polymer material were allowed to vaporize away. The heat-plastified polyethylene in the receiver vessel was excellently suited for extrusion and injection molding and had a density of about 59.2 pounds per cubic foot.

Water was continuously withdrawn from the bottom of the separatory vessel.

Example 2

The polymer employed in this example was a polyethylene having an average molecular weight of about 70,000 as determined by a melt viscosity method. The polymer was in a pulverulent form having a bulk density of 6 pounds per cubic foot.

A slurry was prepared of 10 parts by weight of the polyethylene powder in 90 parts by weight of water. The resulting slurry was pumped through a jacketed pipe heated at 250° C. in the manner described in Example 1 and into a separatory vessel as therein described. The resulting heat-plastified polyethylene mass had a density of about 60 pounds per cubic foot and was excellently suited for extrusion and injection molding into useful articles.

We claim:

1. A method for converting solid polyethylene in particulate form having low bulk density into heat-plastified and densified masses suitable for shaping, which method comprises dispersing a solid polyethylene in particulate form into a heat-transfer liquid to produce a stirrable slurry containing from 5 to 50 percent by volume of solid polyethylene particles, heating the slurry while maintaining the heat-transfer liquid in the liquid state to cause the particles of polyethylene to fuse without degradation, coalescing the fused particles of polyethylene into a heat-plastified mass and forming a layer thereof and a layer of the heat-transfer liquid, and separating the resulting layer of heat-plastified polyethylene from the layer of heat-transfer liquid, the heat-transfer liquid being one that, at the temperature employed for fusion of the polyethylene, is substantially insoluble in, a non-solvent for, and chemically inactive with, the polyethylene.

2. A method according to claim 1 wherein the heat transfer liquid is water.

3. A method according to claim 2 wherein the slurry is heated to a temperature between 150° and 300° C.

4. A method for converting solid polyethylene in particulate form having low bulk density into heat-plastified and densified masses suitable for shaping, which method comprises dispersing a polyethylene in particulate form into liquid water to produce a stirrable slurry containing from 5 to 50 percent by volume of solid polyethylene particles, heating and agitating the slurry while maintaining the water in the liquid state to fuse the polyethylene particles without degradation, subjecting the resulting slurry to a state of quiescence to obtain coalescence of the fused particles into a heat-plastified mass of polyethylene and to obtain separable layers of liquid water and of such heat-plastified polyethylene mass, withdrawing at least a portion of the resulting heat-plastified polyethylene layer, and reducing the pressure upon the withdrawn portion of the heat-plastified polyethylene to cause vaporization of traces of water therefrom.

5. A method according to claim 4 wherein the slurry is heated at a temperature between 150° and 300° C.

References Cited in the file of this patent

UNITED STATES PATENTS

| 2,309,522 | Marks | Jan. 26, 1943 |
| 2,386,674 | Flint et al. | Oct. 9, 1945 |

OTHER REFERENCES

"Industrial Oil and Fat Products" (Bailey), published by Interscience Publishers (New York), 1945, p. 462.